No. 720,407. PATENTED FEB. 10, 1903.
L. G. COLLINS.
PIPE CONNECTION.
APPLICATION FILED NOV. 13, 1902.
NO MODEL.
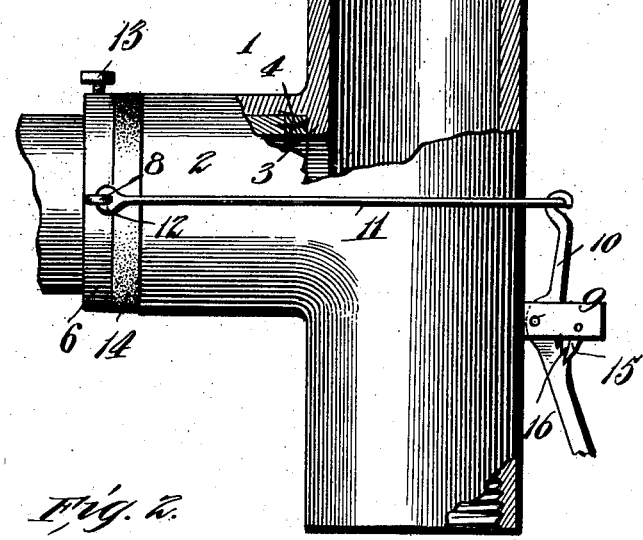
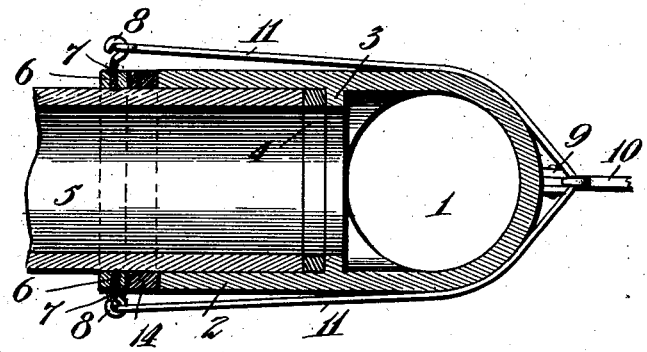
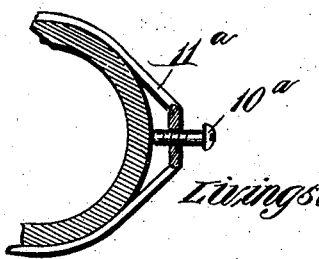

UNITED STATES PATENT OFFICE.

LIVINGSTON G. COLLINS, OF ALICE, TEXAS.

PIPE CONNECTION.

SPECIFICATION forming part of Letters Patent No. 720,407, dated February 10, 1903.

Application filed November 13, 1902. Serial No. 131,121. (No model.)

*To all whom it may concern:*

Be it known that I, LIVINGSTON G. COLLINS, of Alice, in the county of Nueces and State of Texas, have invented a new and useful Improvement in Pipe Connections, of which the following is a specification.

My invention relates to an improved means of connecting the T which usually joins the pipe of a windmill-operated pump to a cistern-pipe, although it may be used where any T or elbow is to be joined to a pipe.

Generally the connection between a T or elbow and a branch pipe is made by threading the ends to be joined; but this is objectionable, because joints made this way frequently become rusty and set so hard that it is practically impossible to separate them without breaking. Then, again, if such threaded joints are unscrewed and screwed up again very often the threads become worn and practically useless. To obviate these objections and overcome the defects above mentioned is the object of my invention, which consists in certain novel features of construction, arrangement, and combinations of parts, as will be hereinafter fully shown and described, and pointed out in the claims.

In the drawings, Figure 1 is a side elevation, partly in section. Fig. 2 is a central horizontal section. Fig. 3 is a view of a modification.

In carrying out my invention, which in this instance is applied to a pumping outfit, I use a T 1, the upper and lower ends of which are internally threaded, as is usual. The horizontal branch or projecting member 2, however, is unthreaded or blank at its outer end; but at its inner end where it adjoins the body of the T it is provided with an internal annular shoulder 3, and on this shoulder is seated a gasket 4, of leather or other suitable material. The pipe 5, which connects with the T and is designed to carry the water to a cistern or other receptacle, is blank or unthreaded and fits snugly in the branch 2 and at its inner ends abuts the gasket 4, seated on the shoulder 3, at a suitable distance from its inner end, and outside of the branch of the T the pipe 5 is provided with a collar 6, which is slidably and adjustably held on said pipe by means of the diametrically oppositely disposed set-screws 7, provided with hooks 8, said set-screws 7 firmly clamping the collar 6 to pipe 5 at any desired point. A set-screw 13 is also threaded through collar 6 to form an additional securing means and also prevents the collar from turning on the pipe 5. A gasket 14 is placed on pipe 5 between the end of branch pipe 2 and the collar 6. On the outside of the T, at a point opposite the branch opening, a lug 9 is cast thereon, to which is pivoted a lever 10. To the upper end of said lever is secured a wire strap 11, which passes around the outside of the T and alongside the branch and is secured at its ends by the eyes 12 to the hooks 8.

The lug 9 is provided with a pivoted dog or pawl 15, which is designed to engage with the serrations 16, disposed along the edge of lever 10 below its pivotal point. Now by forcing the lower end of lever 10 inwardly toward the T the upper end of said lever will be forced outwardly and draw the inner end of the pipe 5 against the gasket 4, and the collar 6, which is firmly held to pipe 5 by the set-screws 7 and 13, will also be drawn against the gasket 14, and thus make a perfect water-tight joint. The lever 10 when it has brought the parts into the required position is held locked in that position by the dog or pawl 15, which will be forced into one of the serrations 16, and the pull on the upper end of the lever 10 will cause the dog or pawl to remain set in the serrations.

By making the ring 6 slidable and removable it may be moved to and clamped at any point on the pipe 5, and thus accommodate itself to any length of branch of T-pipe. Again, should it or the set-screws become broken it can be readily removed and replaced.

In Fig. 3 is shown a modified form of device, in which the lever 10 is done away with and a threaded enlargement $11^a$ made in the wire, through which a set-screw $10^a$ works, the inner end of said set-screw bearing against the outer face of the T when it is screwed inwardly, and thus draws the end of pipe 5 against gasket 4 and collar 6 against gasket 14.

It will be seen that I provide a simple and efficient means for making a joint between the T-joint of a pump-pipe and the cistern-pipe, one which is cheap to make, easily adjusted, and one in which the parts are few and readily replaced when worn or broken.

While I have shown my invention as applied to a T, yet it is obvious that it may be used equally well on an elbow or any other form of pipe or hose where it is desired to make a tight joint. It will be noticed that the ends of the wire strap are removably attached to the ring by means of the hook-shaped set-screws, so that if necessary to renew the pipe 5 it can be quickly done.

Having thus described my invention, what I claim as new, and desire to secure by Letters Patent, is—

1. The combination with a pipe T or elbow provided with an internal annular shoulder at the inner end of its branch pipe, and a gasket seated on said shoulder, of a pipe having a blank end adapted to fit in said branch and abut at its inner end said gasket, an adjustable collar or ring secured to said pipe, hooks projecting from said ring, a wire strap removably secured at its ends to said hooks and surrounding said T, and means for causing traction of the wire strap and drawing the inner end of the pipe tightly against the gasket seated on the internal annular shoulder of the branch of the T or elbow.

2. The combination with a pipe T or elbow having an internal annular shoulder at the inner end of its branch pipe and a gasket seated thereon, and provided with a lug on the outer surface opposite the mouth of said branch, of a pipe having a blank end adapted to abut at its inner end the said gasket, a collar fitting on the outer surface of said pipe at a distance from the inner end, hook-shaped set-screws projecting from said ring, a wire strap removably secured at its ends to said set-screws, and passing around said T or elbow, a lever pivoted to the lug on the outer surface of the T or elbow and secured at its upper end to the wire strap and means for locking said lever whereby the inner end of the blank-ended pipe may be drawn against the gasket on the annular shoulder and form a tight joint.

3. The combination with a pipe T or elbow provided with an annular shoulder at the inner end of its branch pipe, and a gasket seated on said shoulder, of a pipe having a blank end adapted to fit in said branch and abut at its inner end said gasket, a collar or ring adjustably secured on said pipe adjacent to the end of the branch pipe, a gasket interposed between said collar and end of the branch pipe, set-screws passing through the collar at diametrically opposite sides and securing said collar to the blank pipe, a wire strap provided with eyes at its ends secured to said set-screws and passing around said T, and means for causing traction of the wire strap and drawing the inner end of the pipe against the gasket seated on the internal shoulder of the branch of the T, and the collar against the gasket surrounding the pipe.

4. The combination with a pipe T or elbow having an internal annular shoulder at the inner end of its branch pipe and a gasket seated thereon, and provided with a lug on the outer surface opposite the mouth of said branch, of a pipe having a blank end adapted to abut at its inner end the said gasket, a collar fitting on the outer surface of said pipe at a distance from the inner end, a pair of hook-shaped set-screws projecting from said collar, a wire strap provided with eyes at its ends secured to said set-screws, a gasket fitting the outside of the blank pipe and interposed between the collar on said pipe and the end of the T branch, a lever pivoted to the lug on the outer surface of the T secured at its upper end to the wire strap, and provided with serrations or teeth below the pivot, and a pivoted dog or pawl adapted to engage said serrations and hold the lever in its locked position.

LIVINGSTON G. COLLINS.

Witnesses:
F. B. NAYER,
FRANK W. ELLIS.